W. E. KOEHLER.
COMBINED LOCK NUT AND FISH PLATE.
APPLICATION FILED APR. 24, 1912.
1,067,874.
Patented July 22, 1913.
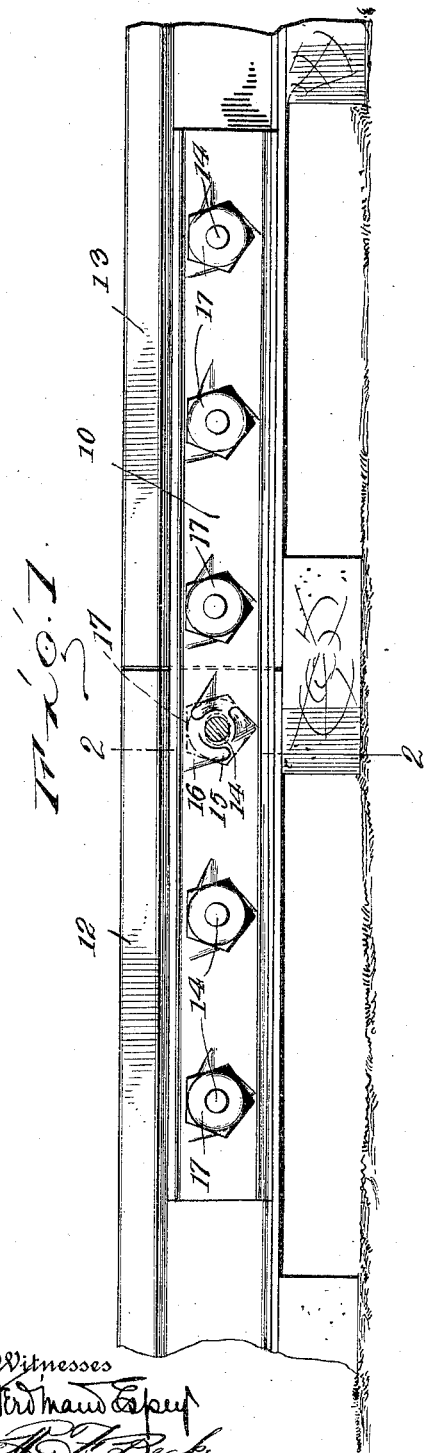
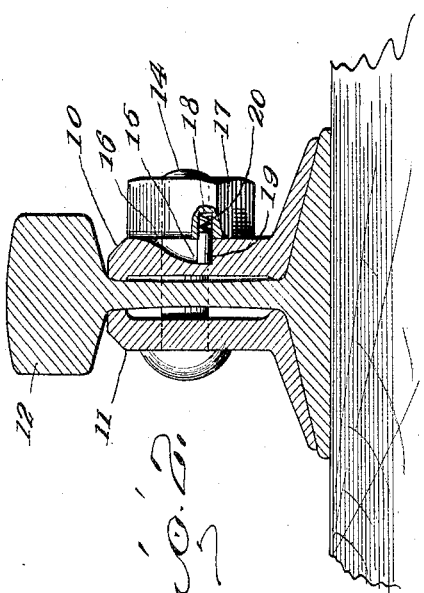
Inventor
William E. Koehler.

UNITED STATES PATENT OFFICE.

WILLIAM E. KOEHLER, OF CLEVELAND, OHIO.

COMBINED LOCK-NUT AND FISH-PLATE.

1,067,874.

Specification of Letters Patent.

Patented July 22, 1913.

Application filed April 24, 1912. Serial No. 692,893.

*To all whom it may concern:*

Be it known that I, WILLIAM E. KOEHLER, a citizen of the United States, residing at Cleveland, in the county of Cuyahoga and State of Ohio, have invented certain new and useful Improvements in Combined Lock-Nuts and Fish-Plates, of which the following is a specification.

This invention relates to improvements in combined fish plates and lock nuts for railway joints, and has for one of its objects to simplify and improve the construction and increase the efficiency and utility of devices of this character.

Another object of the invention is to provide a device of this character which may be readily applied to fish plates already in use or to new fish plates, as may be required, without material structural change in the plates or decreasing their strength.

With these and other objects in view, the invention consists in certain novel features of construction as hereafter shown and described, and then specifically pointed out in the claim, and in the drawings illustrative of the preferred embodiment of the invention, Figure 1 is a side elevation of a railway rail joint including one of the fish plates with the improvement applied; Fig. 2 is an enlarged transverse section on the line 2—2 of Fig. 1 with the nut also partly in section.

Corresponding and like parts are referred to in the following description and indicated in all the views of the drawings by the same reference characters.

The improved device may be applied to any of the ordinary fish plates in common use, and in the drawings the fish plates are represented respectively at 10—11 and the rails at 12—13 with their terminals abutting intermediate the ends of the fish plates. The rails are provided with the usual apertures in their vertical webs to receive the clamp bolts represented at 14, while the fish plates are likewise apertured to receive the bolts. The fish plates 10 against which the clamp nuts engage, are provided with a plurality of recesses 15 spaced at uniform distances from the aperture for the bolt 14 and with the bottom 16 gradually inclined or sloping to provide an inclined entrance or approach to the cavity or recess, with the inner side of the recess, or the side next to the bolt extending at right angles to the outer face of the plate and curved concentrically to the same, with the inner end semicircular, as shown.

The nuts of the bolts 14 are represented conventionally at 17 and are preferably formed with five faces as represented, and each nut is likewise provided with a recess 18 in its inner face which corresponds in position with the recesses 15 of the fish plates so that when the nut is rotated upon its bolt, the recess 18 passes over the recesses 15 and in registering relations therewith. Each of the recesses 18 is provided with a pin 19 which projects into one of the recesses 15 as the nut is rotated, and is supported by a spring 20 which maintains the pin yieldably in its outward position and in engagement with the recesses. By this simple arrangement it will be obvious that when the nut is rotated to apply it to the bolt, the pin 19 will enter the recesses 15 one at a time and pass out over the inclined bottoms 16 of the recesses and enter the next recess, thus entering the recesses consecutively as will be obvious, but by reason of the right-angled ends of the recesses the nuts are effectually prevented from being turned rearwardly or from retrogading. By providing a plurality of the recesses, the nut may be locked in position when turned only a portion of a revolution. Any required number of the recesses may be employed, but ordinarily three will be used, as shown.

It will here be noted that by making the mouth of the entrance to each recess 15 of greater width than the recess, the spring locking pins on the nuts will be effectually guided to their seats in the fish plate, without the necessity of accurately centering said fish plate on the securing bolts. It will also be noted that the outer tangential wall of each recess 15 serves to guide a nail or other tool to the base of the spring pawl, when it is desired to disengage said pawl from the adjacent recess with a view to removing the nut from the securing bolt.

The improved device is simple in construction, can be inexpensively manufactured, and does not seriously weaken the fish plates or the nut.

Having thus described the invention, what is claimed as new is:

A supporting body having a bolt receiving aperture and with a plurality of recesses in one face of the body adjacent to the bolt aperture, each of said recesses having its bottom sloping to provide an inclined entrance thereto and with the inner end of each recess semi-circular and at right angles to the face of the body, one wall of the recess being at right angles to the face of the body and curved concentrically to the bolt opening, a bolt engaging the bolt opening, a nut engaging the bolt and provided with a socket, and a spring actuated pin within the nut socket and adapted to enter the recesses of the body one at a time, the mouth of each entrance being of greater width than the diameter of the recess.

In testimony whereof I affix my signature in presence of two witnesses.

WILLIAM E. KOEHLER. [L. S.]

Witnesses:
ARTHUR S. PICKERING,
EDMOND W. BOULTON, Jr.

Copies of this patent may be obtained for five cents each, by addressing the "Commissioner of Patents, Washington, D. C."